(12) United States Patent
Joo et al.

(10) Patent No.: US 11,871,774 B2
(45) Date of Patent: Jan. 16, 2024

(54) OLIGOSACCHARIDE SYRUP HAVING IMPROVED STABILITY

(71) Applicant: SAMYANG CORPORATION, Seoul (KR)

(72) Inventors: Kyung Ho Joo, Seoul (KR); Kwang Soo Kim, Seongnam-si (KR)

(73) Assignee: SAMYANG CORPORATION, Seoul (KR)

( * ) Notice: Subject to any disclaimer, the term of this patent is extended or adjusted under 35 U.S.C. 154(b) by 84 days.

(21) Appl. No.: 17/518,703

(22) Filed: Nov. 4, 2021

(65) Prior Publication Data

US 2022/0053810 A1   Feb. 24, 2022

Related U.S. Application Data

(62) Division of application No. 16/344,059, filed as application No. PCT/KR2017/012019 on Oct. 27, 2017, now Pat. No. 11,191,292.

(30) Foreign Application Priority Data

Oct. 28, 2016   (KR) ........................ 10-2016-0142247

(51) Int. Cl.
  A23L 29/30   (2016.01)
  A23L 29/00   (2016.01)
  A23L 3/3508  (2006.01)

(52) U.S. Cl.
  CPC ............. *A23L 29/30* (2016.08); *A23L 3/3508* (2013.01); *A23L 29/035* (2016.08); *A23V 2002/00* (2013.01); *A23V 2250/032* (2013.01); *A23V 2250/042* (2013.01); *A23V 2250/284* (2013.01); *A23V 2250/60* (2013.01); *A23V 2250/708* (2013.01)

(58) Field of Classification Search
  None
  See application file for complete search history.

(56) References Cited

FOREIGN PATENT DOCUMENTS

WO   WO-2015015210 A1 *  2/2015   ............... A23L 2/60

* cited by examiner

Primary Examiner — Jyoti Chawla
(74) Attorney, Agent, or Firm — LEX IP MEISTER, PLLC

(57) ABSTRACT

The present invention relates to a saccharide syrup composition comprising an organic acid or its salt and an oligosaccharide, and more specifically, the saccharide syrup composition comprises allulose.

8 Claims, 2 Drawing Sheets

[FIG. 1]
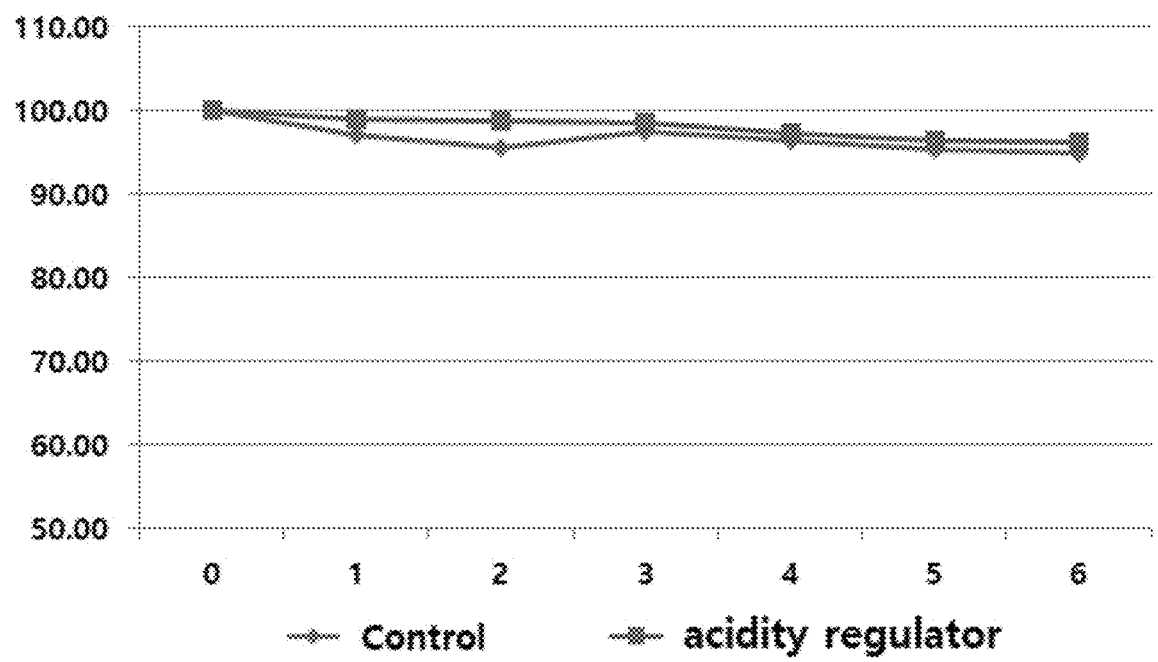

[Fig. 2]
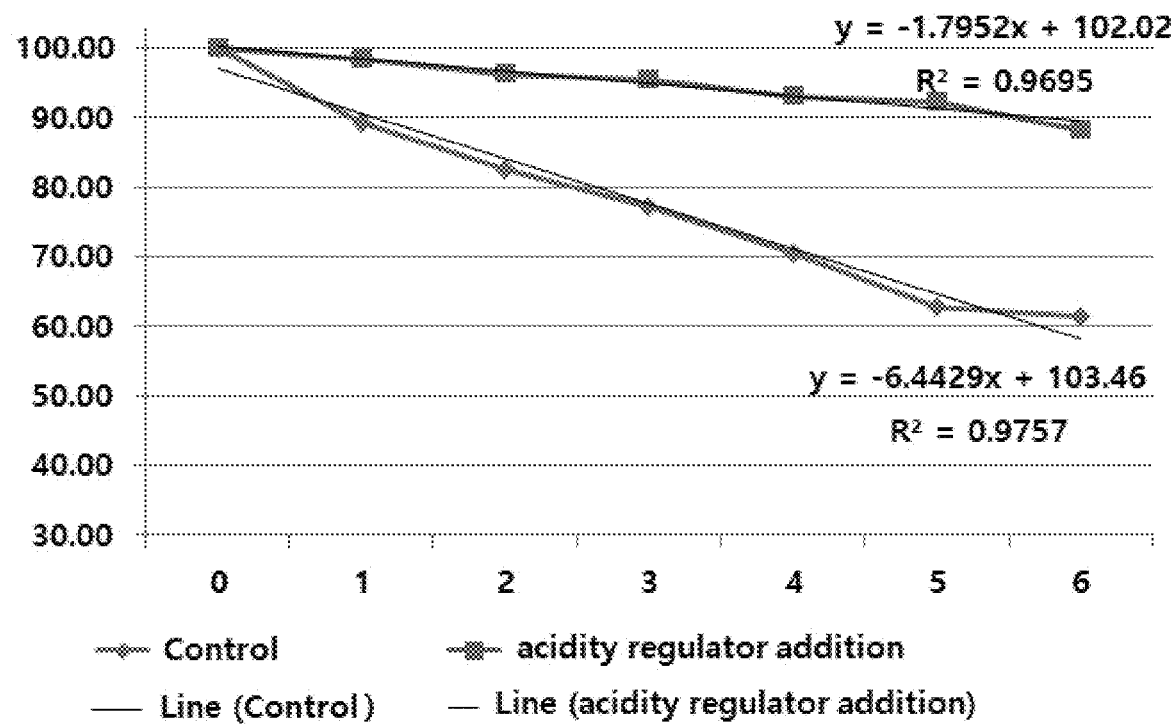

OLIGOSACCHARIDE SYRUP HAVING IMPROVED STABILITY

TECHNICAL FIELD

The present invention relates to a saccharide syrup composition comprising an organic acid or its salt and an oligosaccharide, and more specifically, is a saccharide syrup composition comprising an organic acid, which prevents decomposition of an oligosaccharide comprised in the saccharide syrup composition, or its salt and an oligosaccharide, and the saccharide syrup composition may comprise allulose.

BACKGROUND ART

Sweeteners have been used as additives in foods and the like for a long time, and natural sugars such as sugars, fructose and glucose are widely used in beverage, food, pharmaceutical and oral hygiene/cosmetic industries due to their good tastes. In particular, sugar is widely used because it gives a desirable taste to consumers.

Sugar has excellent sweetness, and therefore it has been considered as the most preferable sweetener to enhance the taste of food and increase the taste by being added to various foods and processed foods, etc. from the past. However, recently, a problem has been raised as the harmfulness of sugar continues to be revealed.

As one of solutions to solve adult diseases, obesity, etc. which have become a problem in the world recently, various policies for reducing sugar consumption of their own nation in many countries including Korea have been implemented. Herein, unless otherwise stated, the term "saccharide reduction" means that the content of monosaccharides such as glucose, fructose, sucrose, etc. and disaccharides which are known to increase the risk of occurrence of obesity, diabetes, cardiovascular diseases, other various adult diseases when overdosed is lowered, and in this case, the "saccharide" does not include rare saccharides such as allulose and the like.

Specifically, as excessive intake of sugar is pointed out as a major cause of various lifestyle diseases such as obesity, diabetes as well as cavities, etc., the necessity of development of sweeteners which can replace it has been emerging all over the world. Recently, various sweetener materials have been developed.

Allulose is an epimer of carbon number 3 in fructose, and has sweetness equivalent to 70% of fructose and it is functional sugar which controls blood sugar, prevents cavities and inhibits lipogenesis in liver. Sugar alcohols, which are widely used as a substitute sweetener for sugar, have side effects such as causing diarrhea when consumed over a certain amount, but allulose have no known side effects. Therefore, the interest of allulose as a sweetener has been increased.

As another saccharide, a large number of oligosaccharides (functional oligosaccharides) have been used in food since various functionalities have been recognized. The oligosaccharide means a component showing the functionality not to be decomposed by digestive enzymes but to function similar to dietary fiber and to go down into the large intestine to become a nutrient source of intestinal beneficial bacteria, and to improve the colonic environment, among oligosaccharides in a form in which 3 to 10 monosaccharides are linked together.

In recent years, many products applying oligosaccharides, etc. have been introduced, but these oligosaccharides have a property of being easily decomposed by heating conditions, etc., and thus a method for preventing decomposition and maintaining the initial content is needed.

DISCLOSURE

Technical Problem

An object of the present invention is to provide a saccharide syrup composition comprising an organic acid or its salt and an oligosaccharide, which prevents or reduces oligosaccharide decomposition to maintain the content of the oligosaccharide present in the saccharide syrup during a storage period and a method for preparing thereof.

Another object of the present invention is to provide a method for preventing decomposition of an oligosaccharide present in saccharide syrup by adding an organic acid or its salt to saccharide syrup.

An additional object of the present invention is to provide raw material saccharide syrup comprising an organic acid or its salt, oligosaccharides and allulose, and food, food additives, beverage or beverage additives, functional foods applying it.

Technical Solution

One embodiment of the present invention relates to a saccharide syrup composition for preventing oligosaccharide decomposition, comprising an organic acid or its salt and an oligosaccharide, and the organic acid or its salt may be comprised at a concentration of 0.001 to 1.0 wt %. The organic acid or its salt may be lactic acid, citric acid or ascorbic acid or salts thereof.

Another embodiment of the present invention relates to a method for preventing decomposition of the oligosaccharide, by adding an organic acid or its salt of 0.001 to 1.0 wt %, to a saccharide syrup composition comprising an oligosaccharide.

The saccharide syrup composition according to the present invention may comprise the oligosaccharide content of 80% or more, based on 100% of the initial content of the oligosaccharide under a storage condition of a temperature of 45° C. during a period of 6 weeks (42 days).

The saccharide syrup composition according to the present invention may has an 100 to 1000 μS/cm of electrical conductivity, 0.005 to 0.2 of a color value represented as absorbance measured at 420 nm wavelength with a spectrometer, or pH of 5.0 to 8.0.

The saccharide syrup composition according to the present invention may comprise the oligosaccharide content of 20 to 90 wt %, based on 100 wt % of the saccharide syrup composition, and it may comprise the oligosaccharide content of 80% or more, based on 100% of the initial content of the oligosaccharide under a storage condition of a temperature of 45° C. during a period of 6 weeks (42 days).

Hereinafter, the present invention will be described in more detail.

The present invention is a saccharide syrup composition which maintains the oligosaccharide content in saccharide syrup at a certain content or more and prevents decomposition of the oligosaccharide, by adjusting an organic acid or its salt at a specific concentration in a saccharide syrup composition comprising an oligosaccharide.

The property of maintaining the oligosaccharide content in saccharide syrup at a certain content or more and preventing decomposition of the oligosaccharide may comprise the content of the oligosaccharide of 80% or more, preferably, 83% or more, 85% or more, 87% or more, or 90% or more, based on 100% of the initial content of the oligosaccharide under a storage condition of a temperature of 45° C. during a period of 6 weeks (42 days). It is preferable to set the lower limit of the oligosaccharide content to 80%, in consideration of the allowable error of food labeling standards being 80%. Therefore, as the saccharide syrup in which an organic acid or its salt is added satisfies the condition of the oligosaccharide content for a long time, there is an effect of prolonged storage period.

The saccharide syrup composition according to the present invention may have an electrical conductivity of 100 to 1000 μS/cm, preferably 100 to 700 μS/cm, more preferably 100 to 500 μS/cm, and may have a color value represented by absorbance measured at 420 nm wavelength by a spectrometer of 0.005 to 0.2, preferably 0.01 to 0.1, or may have pH 5.0 to 8.0, preferably pH 5.5 to 6.5, pH 5.5 to 8.0, pH 5.5 to 7.5, pH 6.0 to 8.0, pH 6.0 to 7.5, pH 6.0 to 7.0, or pH 6.0 to 6.5.

In a specific example of the present invention, it was confirmed that the oligosaccharide content was gradually reduced as the storage period passed in the experimental group in which an organic acid or its salt was not added and the experimental group in which an inorganic acid (NaOH) was added, as saccharide syrup adjusted to the same pH condition. Oligosaccharides tends to be decomposed intensively at pH 5 or lower, and it can be seen that the above result is attributed to the fact that the acidity regulator inputted additionally increases the initial pH and inhibits pH decrease during the storage period. However, it can be seen that the oligosaccharide composition does not depend on the pH condition of the saccharide syrup only by such a result.

In addition, when using an organic acid or its salt, different from an inorganic acid, an electrical conductivity is 100 to 200 μS/cm, and there is an effect of preventing pH changes because of a high electrical conductivity. The organic acid or its salt can prevent decomposition of an oligosaccharide by not only regulating the acidity but also further providing a pH buffer function which can minimize pH changes during the storage period.

The organic acid or its salt usable for the present invention may be an organic acid of one or more kinds selected from the group consisting of lactic acid, citric acid and ascorbic acid, and salt thereof. The organic acid salt may be sodium, potassium, calcium or magnesium of the organic acid.

The organic acid or its salt may be comprised at a concentration of 0.001 to 1.0 wt %, preferably 0.005 to 0.5 wt % or 0.01 to 0.1 wt %.

The saccharide syrup composition according to the present invention may comprise an oligosaccharide, and as the oligosaccharides applicable for the present invention, one or more kinds selected from the group consisting of fructo-oligosaccharide (FOS), isomalto-oligosaccharide (IMO), galacto-oligosaccharide (GOS), xylo-oligosaccharide (XOS), chito-oligosaccharide, cello-oligosaccharide and soy oligosaccharide may be selected.

The fructo-oligosaccharide belongs to a compound known as inulin. Inulin is a generic term for a carbohydrate substance consisting mainly of fructose residues linked via a fructosyl-fructose bond of β (2→1) type, randomly having a starting residue of glucose. Commercially available FOS is a multi-dispersion having a number-average polymerization degree of typically about 2 to 4. In fact, FOS is also referred to as oligo-fructose. The fructo-oligosaccharide is a raw material prepared by transferring fructose to sugar using an invertase (β-fructofuranosidase), or by partially hydrolyzing inulin to inulinase (EC 3.2.1.7), and functional components are GF2 (kestose), GF3 (nystose) and GF4 (fructofuranosylnystose).

The syrup composition according to the present invention may comprise an oligosaccharide of 20 to 90 wt %, preferably 25 to 65 wt % or 25 to 75 wt %, based on 100 wt % of the total syrup composition, and may comprise syrup of various saccharides, preferably allulose syrup as other saccharides.

The allulose syrup may be comprised as 10 wt % or more, 15 wt % or more, 25 wt % or more, 35 wt % or more, or 50 wt % or more, based on 100 wt % of the total syrup composition, and for example, it may be 10 to 80 wt %, preferably 35 to 80 wt %, or 25 to 75 wt %.

In one example of the present invention, when the raw material saccharide syrup comprises allulose syrup and oligosaccharides, allulose of 10 to 80 wt % and oligosaccharides of 20 to 90 wt % based on 100 wt % of the raw material saccharide syrup may be comprised. The raw material saccharide syrup may comprise a solid content of 60 to 80 Brix.

The allulose syrup may comprise glucose, fructose and saccharides of disaccharides or more in addition to allulose. The allulose syrup may be prepared by various methods, and preferably, it may be prepared by a biological method, for example, microbial enzyme reaction.

For example, the allulose syrup may be allulose-containing mixed sugar or be obtained therefrom, and the mixed sugar may be mixed sugar prepared by reacting one or more kinds selected from the group consisting of an allulose epimerase, a microbial cell of a strain producing the epimerase, a culture of the strain, a lysate of the strain, and an extract of the lysate or culture with a fructose-containing raw material, or be obtained therefrom. The mixed saccharide syrup may be mixed sugar comprising allulose 2 to 55 parts by weight, fructose 30 to 50 parts by weight, glucose 2 to 60 parts by weight and oligosaccharide 0 to 15 parts by weight, and the allulose syrup may be obtained via separation, purification and concentration processes from the mixed sugar. In one example of the present invention, the allulose syrup passing through separation and purification processes may be allulose syrup which has an electrical conductivity of 1 to 50 μS/cm, and is colorless or light-yellow liquid having sweetness and comprises allulose of 10 wt % or more.

As one embodiment for preparation of allulose according to the present invention, an expression system capable of producing a psicose epimerase with high expression rate and stability, a GRAS (Generally recognized as safe) microorganism using the same, and a method for preparation of psicose comprising a microorganism and an enzyme using the expression system, etc. are described in Korean Patent Nos. 10-1318422 and 10-1656063, etc. in detail.

The viscosity of the saccharide syrup composition according to the present invention may be adjusted in an appropriate range in consideration of a method of use and convenience, and preferably, the viscosity measured at a temperature of 25° C. may be 5 to 100 mPa·s, preferably 10 to 30 mPa·s, 15 to 25 mPa·s or 18-20 mPa·s. To adjust the viscosity of the saccharide syrup, a viscosity regulator may be used, and preferably, the viscosity regulator may increase the viscosity of saccharide syrup. The viscosity regulator may have a low degree of dispersion and solubility in allulose syrup and a dispersing agent to solve this may be further added.

The viscosity regulator according to the present invention is a component to be added for viscosity regulation of the saccharide syrup composition, and a specific example may be one or more kinds selected from the group consisting of thickening polysaccharides (hydrogel), and for example, it may be pectin or carrageenan. Carrageenan may be added in a relatively small amount, as the viscosity increase degree is higher than pectin. The content of the viscosity regulator according to one example of the present invention may be 0.01 to 5 wt %, for example, 0.05 to 1 wt %, based on 100 wt % of the saccharide syrup composition.

The dispersing agent according to the present invention is added in order to improve the low degree of dispersion and solubility of the viscosity regulator. A specific example of the dispersing agent may be one or more kinds selected from the group consisting of disaccharides, sugar alcohols and oligosaccharides, and preferably, may be oligosaccharides. It is preferable to add the dispersing agent in a powder form. The content of the dispersing agent according to an embodiment of the present invention may be 10 to 3,000 parts by weight, for example, 50 to 2,000 parts by weight, or 100 to 1,000 parts by weight, based on 100 parts by weight of the viscosity regulator.

In one example of the present invention, the saccharide syrup composition may have a chromaticity of 100 to 500 IU. The numerical value range of the chromaticity may be adjusted by the saccharide syrup itself, or may be adjusted by adding one or more kinds of chromaticity regulators selected from the group consisting of raw sugar extracts, caramel syrup and artificial dyes. The content of the chromaticity regulator to be added may be an appropriate content in consideration of chromaticity (IU) which each chromaticity regulator has, and for example, the content of the chromaticity regulator may comprise the content of 0.0001 to 1 wt % based on 100 wt % of the saccharide syrup composition.

In one example of the present invention, the saccharide syrup composition may further comprise one or more kinds of sweetener materials selected from the group consisting of sucralose, rebaudioside and stevia for regulation of sweetness. The content of the sweetener materials to be added may be comprised in an appropriate content in consideration of sweetness of each material compared to sugar, and for example, it may be comprised in a content of 0.00001 to 5 wt % based on 100 wt % of the saccharide syrup composition.

The saccharide syrup comprising an organic acid or its salt, oligosaccharides and allulose according to the present invention may be commercialized as itself and the present invention relates to food, food additives, beverage or beverage additives and functional food.

Advantageous Effects

The saccharide syrup composition according to the present invention can prevent decomposition of an oligosaccharide present in syrup using an organic acid or its salt and maintain the content in a certain level or more, thereby having effects of preservation of physical properties of the saccharide syrup, preservation of the content of the oligosaccharide, and extension of a storage period.

BRIEF DESCRIPTION OF DRAWINGS

FIG. 1 is a graph showing the content changes of allulose with the storage period passage during storage of allulose syrup containing an oligosaccharide according to Example 1.

FIG. 2 is a graph showing the content changes of the oligosaccharide with the storage period passage during storage of allulose containing an oligosaccharide according to Example 1.

MODE FOR INVENTION

The present invention will be described in more detail with the following examples, but the following examples are provided as an exemplary meaning of the present invention only and are not intended to limit the scope of the present invention.

Comparative Example 1

1-1: Saccharide Syrup Preparation

The allulose syrup used for the following examples was prepared according to the method disclosed in Korean Patent No. 10-1318422. From the raw material containing fructose in a content of 95 wt %, the allulose syrup consisting of 24~26 (w/w) % in which glucose:fructose:allulose:oligosaccharide=6:67:25:2 of 70 Brix was obtained.

The obtained allulose syrup was treated by flowing through a column at a room temperature filled with cation exchange resin, anion exchange resin and resin in which cation and anion exchange resins were mixed, in order to remove impurities such as colored and ion components and the like. Then, using chromatography filled with calcium ($Ca^{2+}$) type of ion exchange resin, a high purity of allulose fractions were obtained. The allulose fractions were ion purified and concentrated, thereby preparing the allulose syrup consisting of allulose 95 wt % and fructose 5 wt %, based on 100 wt % of the solid content of the saccharide syrup composition.

To 60 wt % of the prepared allulose syrup, fructo-oligosaccharide 40 wt % was added, thereby preparing the allulose saccharide syrup containing an oligosaccharide. The fructo-oligosaccharide used was product of Samyang corporation.

The pH, color value and electrical conductivity of the allulose syrup having allulose content of 95 wt % and the allulose saccharide syrup containing the oligosaccharide were measured and shown in the following Table 1. In the following Table 1, the raw saccharide syrup contains the allulose syrup of 60 wt % and fructo-oligosaccharide of 40 wt %.

TABLE 1

| Classification | Allulose syrup with 95% of allulose | Raw saccharide syrup |
|---|---|---|
| pH | 4.41 | 4.51 |
| color value (absorbance, 420 nm) | 0.039 | 0.064 |
| Electrical conductivity (µS/cm) | 15.13 | 50.94 |

1-2: Evaluation of Physical Properties Depending on Storage Periods

While the saccharide syrup containing 60 wt % of the allulose syrup having allulose content of 95 wt % and 40 wt % of fructo-oligosaccharide (FOS) prepared in 1-1 was stored at a temperature of 25° C., 35° C., and 45° C. for 7 weeks, the pH, color value, allulose content and oligosaccharide content depending on the storage period were measured. Specific measurement of physical properties was performed as the following method.

(1) Color Value Measurement

The allulose syrup was diluted to 30BX, and using a spectrophotometer, the absorbance at 420 nm wavelength was measured. Measuring the color value as the absorbance at 420 nm wavelength using a spectrophotometer is to confirm the degree of browning as yellow to brown were absorbed at 420 nm and to calculate IU (Icumsa Unit) for determining the degree of browning or color darkness of liquid saccharides using the absorbance value measured at the wavelength.

(2) Sugar Composition Analysis

The allulose syrup was analyzed by using high speed liquid chromatography (HPLC) equipped with carbohydrate analysis column Bio-rad Aminex HPX-87C under the following analysis conditions.

<Analysis Conditions>

Injection amount: 10 µl

Column temperature: 80° C.

Flow rate: 0.6 ml/min

Mobile phase: distilled water (3) pH Analysis

The allulose syrup was diluted to 10Bx, and using a pH measuring instrument (SCHOTT Lab850), the pH of the saccharide syrup was analyzed.

(4) Electrical Conductivity Analysis

The electrical conductivity was measured by using InLab 731 ISM electrode in SevenExcellence equipment of METTLER TOLEDO.

The result of evaluation of physical properties measured was shown in the following Table 2.

TABLE 2

| Storage week order | Classification | 25° C. | 35° C. | 45° C. |
|---|---|---|---|---|
| 0 | pH | 4.51 | 4.51 | 4.51 |
|  | color value | 0.064 | 0.064 | 0.064 |
|  | Allulose | 56.27 | 56.27 | 56.27 |
|  | Oligosaccharide | 23.98 | 23.98 | 23.98 |
| 1 | pH | 3.48 | 3.43 | 3.52 |
|  | color value | 0.062 | 0.066 | 0.07 |
|  | Allulose | 55.3 | 55.5 | 54.6 |
|  | Oligosaccharide | 23.5 | 22.5 | 21.4 |
| 2 | pH | 3.91 | 3.74 | 3.61 |
|  | color value | 0.066 | 0.073 | 0.091 |
|  | Allulose | 55.4 | 54.96 | 53.71 |
|  | Oligosaccharide | 23.42 | 21.89 | 19.79 |
| 3 | pH | 4.46 | 4.12 | 3.9 |
|  | color value | 0.071 | 0.084 | 0.1 |
|  | Allulose | 55.68 | 55.89 | 54.8 |
|  | Oligosaccharide | 23.1 | 21.77 | 18.53 |
| 4 | pH | 4.36 | 4.17 | 3.97 |
|  | color value | 0.067 | 0.106 | 0.122 |
|  | Allulose | 56.48 | 55.61 | 54.21 |
|  | Oligosaccharide | 22.75 | 21.1 | 16.9 |
| 5 | pH | 4.46 | 4.32 | 4.16 |
|  | color value | 0.064 | 0.111 | 0.139 |
|  | Allulose | 56.21 | 55.54 | 53.59 |
|  | Oligosaccharide | 23.65 | 21.27 | 15.03 |
| 6 | pH | 4.45 | 4.33 | 4.12 |
|  | color value | 0.069 | 0.116 | 0.148 |
|  | Allulose | 55.94 | 55.1 | 53.41 |
|  | Oligosaccharide | 23.55 | 21.19 | 14.77 |
| 7 | pH | 4.33 | 4.2 | 4.03 |
|  | color value | 0.071 | 0.116 | 0.146 |
|  | Allulose | 55.58 | 55.25 | 54.22 |
|  | Oligosaccharide | 18.73 | 16.45 | 9.38 |

Example 1

The allulose syrup containing an oligosaccharide (containing 60 wt % of the allulose syrup with 95 wt % of allulose content and 40 wt % of oligosaccharide) was prepared by the substantially same method as Comparative example 1, and the aqueous solution having the concentration of lactic acid sodium salt of 40 wt % was added so that concentration of the lactic acid sodium salt was 0.02 wt %, thereby preparing the allulose syrup containing an oligosaccharide.

The pH and vhromaticitye, and allulose and oligosaccharide contents of the prepared allulose syrup were measured by the same method as Comparative example 1. The measured result was shown in the following Table 3.

TABLE 3

| Storage week order | Classification | 25° C. | 35° C. | 45° C. |
|---|---|---|---|---|
| 0 | pH | 5.5 | 5.5 | 5.5 |
|  | color value | 0.059 | 0.059 | 0.059 |
|  | Allulose | 58.1 | 58.1 | 58.1 |
|  | Oligosaccharide | 22.7 | 22.7 | 22.7 |
| 1 | pH | 5.6 | 5.52 | 5.49 |
|  | color value | 0.053 | 0.061 | 0.083 |
|  | Allulose | 58 | 58.11 | 57.49 |
|  | Oligosaccharide | 22.69 | 22.62 | 22.33 |
| 2 | pH | 5.51 | 5.45 | 5.41 |
|  | color value y | 0.055 | 0.07 | 0.103 |
|  | Allulose | 57.91 | 57.5 | 57.33 |
|  | Oligosaccharide | 22.39 | 22.34 | 21.84 |
| 3 | pH | 5.48 | 5.31 | 5.1 |
|  | color value | 0.065 | 0.091 | 0.105 |
|  | Allulose | 57.94 | 57.46 | 57.19 |
|  | Oligosaccharide | 22.4 | 22.19 | 21.69 |
| 4 | pH | 5.42 | 5.11 | 4.98 |
|  | color value | 0.073 | 0.11 | 0.128 |
|  | Allulose | 57.96 | 56.99 | 56.5 |
|  | Oligosaccharide | 22.41 | 21.94 | 21.15 |
| 5 | pH | 5.39 | 5.2 | 4.72 |
|  | color value | 0.077 | 0.121 | 0.151 |
|  | Allulose | 57.95 | 56.91 | 56.01 |
|  | Oligosaccharide | 22.39 | 21.91 | 20.93 |
| 6 | pH | 5.33 | 5.1 | 4.7 |
|  | color value | 0.081 | 0.119 | 0.166 |
|  | Allulose | 57.84 | 56.59 | 55.86 |
|  | Oligosaccharide | 22.27 | 21.84 | 20.06 |
| 7 | pH | 5.29 | 5.08 | 4.54 |
|  | color value | 0.08 | 0.13 | 0.176 |
|  | Allulose | 57.88 | 56.33 | 55.29 |
|  | Oligosaccharide | 22.31 | 21.57 | 19.64 |

In the table, the reference value was set in which the initial allulose content in the saccharide syrup of 56.27 wt % was set to 100, and the allulose content (wt %) depending on the storage period (week order) was represented by a relative allulose content to the initial allulose content in the syrup and shown in FIG. 1. As shown in FIG. 1, the allulose content change during the storage period tended to be slightly reduced as time passed, but there was no significant difference between Comparative example 1 and Example 1 in which the organic acid salt as an acidity regulator was added.

As the initial oligosaccharide content in the saccharide syrup of 23.98 wt % was set to 100, the relative oligosaccharide content (wt %) depending on the storage period (week order) was represented and shown in FIG. 2. As shown in FIG. 2, the oligosaccharide content change during the storage period tended to be reduced as time passed. The lower limit of the oligosaccharide content was set to 80% in consideration that the allowable error of food labeling standards was 80%, and the result of the oligosaccharide content change depending on the storage period was analyzed. Specifically, when stored under the severe condition of 45° C., it was confirmed that the slope of the decrease line of the oligosaccharide content in the group to which the organic acid salt was added was lowered about 3.5 times, compared to the control group of Comparative example 1. In addition, when the lower limit of the oligosaccharide content was set to 80%, the non-added group (without the organic acid salt) of Comparative example 1 went off the reference value in three weeks, but the organic acid salt-added group, of Example 1 maintained the reference value for 12 weeks, which had an effect to extend the quality maintenance period to 4 times.

As shown in the results of Table 2 and Table 3, in case of Comparative example 1, the oligosaccharide content change under the 35° C. storage condition was decreased by 7.5% for 7 weeks, but in the syrup of Example 1 in which the acidity regulator was added, it was shown lower as 1.13%. Oligosaccharides tend to be decomposed intensively under pH 5 or lower, and this result is because the additionally inputted acidity regulator increased the initial pH and inhibited the pH decrease during the storage period.

Example 2

The allulose syrup containing an oligosaccharide (60 wt % of allulose syrup having allulose content of 95 wt % and 40 wt % of oligosaccharide) was prepared by the substantially same method as Comparative example 1, and the allulose syrup containing an oligosaccharide was prepared by adding the aqueous solution in which the concentration of citric acid sodium salt was 40 wt % so that the citric acid sodium salt was 0.02 wt %. The pH and color value, and allulose and oligosaccharide contents of the prepared saccharide syrup were measured by the same method as Comparative example 1. The measured result was shown in the following Table 4.

To perform the severe experiment of the prepared saccharide syrup, acid was added to each experimental group to adjust the pH to 5.5. The pH-adjusted syrup was stored under the storage condition at 45° C. for 2 weeks, and then pH, color value, and allulose and oligosaccharide contents of the saccharide syrup were measured by the same method as Comparative example 1. The measured result was shown in the following Table 4.

Comparative Example 1

As substantially same as Example 2 except for not adding the citric acid salt, the allulose saccharide syrup containing an oligosaccharide was prepared and the pH was adjusted to 4.3 by adding acid. The pH-adjusted syrup was stored under the 45° C. storage condition for 2 weeks, and then the pH and color value, and allulose and oligosaccharide contents of the allulose syrup were measured by the same method as Comparative example 1. The measured result was shown in the following Table 4.

Comparative Example 2

As substantially same as Example 2 except for adding NaOH (sodium hydroxide) in an amount of 0.005 wt % instead of the citric acid salt of Example 2, the allulose syrup was prepared. When the pH of the prepared syrup was higher than 5.5, hydrochloric acid was added to adjust the pH to 5.5. The pH-adjusted syrup was stored at 45° C., and then the pH and color value, and allulose and oligosaccharide contents of the allulose syrup were measured by the same method as Comparative example 1. The measured result was shown in the following Table 4.

TABLE 4

| Storage week order | Classification | Example 2 | Comparative example 1 | Comparative example 2 |
|---|---|---|---|---|
| initial | pH | 5.5 | 4.3 | 5.5 |
| | color value | 0.064 | 0.039 | 0.072 |
| | Allulose | 56.55 | 56.61 | 56.63 |
| | Oligosaccharide | 24.26 | 24.19 | 24.3 |
| | Electrical conductivity (µS/cm) | 172.6 | 50.3 | 83.2 |
| 1 week later | pH | 5.3 | 3.9 | 4.9 |
| | color value | 0.071 | 0.053 | 0.111 |
| | Allulose | 56.52 | 56.59 | 56.54 |
| | Oligosaccharide | 24.1 | 21.88 | 23.64 |
| | Relative oligosaccharide content compared to the initial content | 99.34% | 90.45% | 97.28% |
| | Electrical conductivity (µS/cm) | 180.4 | 68.2 | 90.6 |
| 2 weeks later | pH | 5.1 | 3.5 | 4.2 |
| | color value | 0.090 | 0.066 | 0.126 |
| | Allulose | 56.50 | 5.59 | 56.52 |
| | Oligosaccharide | 23.94 | 18.31 | 21.77 |
| | Relative oligosaccharide content compared to the initial content | 98.68% | 75.69% | 89.59% |
| | Electrical conductivity (µS/cm) | 181.2 | 74.5 | 93.3 |

It was confirmed that in case of the non-added group of Comparative example 1, the initial pH was low and decomposition of the oligosaccharide was progressed by the pH decrease as the storage time passed. It was confirmed that in case of Comparative example 2 in which the pH was adjusted by using NaOH, the pH was dramatically decreased under the severe experimental condition, and it was interpreted that strong acids and strong bases (inorganic salts) are effective for adjustment of the initial pH, but have no buffering effect.

As shown in Table 4, comparing Example 2 to which the citric acid salt was added to Comparative example 1 which is the non-added group and Comparative example 2 to which the inorganic salt was added, it seems to perform a function to prevent pH change as the electrical conductivity of the saccharide syrup of Example 2, to which the citric acid salt, was added was high. The allulose syrup used in the present invention performed a role for preventing the pH decrease and maintaining the oligosaccharide content, since pH change was severe as ionic substances were removed through purification and addition of the citric acid salt had a pH buffering effect.

The invention claimed is:
1. A method for preventing oligosaccharide decomposition, by adding an organic acid or its salt of 0.001 to 1.0 wt % to a saccharide syrup composition comprising 20 to 90 wt % of the oligosaccharide and 10 to 80 wt % of allulose syrup based on 100 wt % of the saccharide syrup composition,
wherein the allulose syrup has an electrical conductivity of 1 to 50 µS/cm, wherein the saccharide syrup composition added by the organic acid or its salt has an electrical conductivity of 100 to 1000 μS/cm.

2. The method according to claim 1, wherein the oligosaccharide is one or more kinds selected from the group consisting of galacto-oligosaccharide, malto-oligosaccharide, isomalto-oligosaccharide, fructo-oligosaccharide and soy oligosaccharide.

3. The method according to claim 1, wherein pH of the saccharide syrup composition is 5.0 to 8.0.

4. The method according to claim 1, wherein the color value of the saccharide syrup composition is 0.005 to 0.2.

5. The method according to claim 1, wherein the preventing oligosaccharide decomposition is to have a content of the oligosaccharide of 80% or more, based on 100% of the initial content of the oligosaccharide, under storage conditions of a temperature of 45° C. and 42 days.

6. The method according to claim 1, wherein the allulose syrup is provided with a mixed saccharide containing allulose or the allulose syrup is obtained from the mixed saccharide and the mixed saccharide is prepared by reacting a fructose-containing raw material with a composition for producing allulose comprising one or more selected from the group consisting of an allulose epimerase, a microbial cell of a strain producing the allulose epimerase, a culture of the strain, a lysate of the strain, and an extract of the lysate or the culture.

7. The method according to claim 6, wherein the allulose syrup is obtained from separation and concentration processes from mixed sugar comprising allulose 2 to 55 parts by weight, fructose 30 to 80 parts by weight, glucose 2 to 60 parts by weight and oligosaccharide 0 to 15 parts by weight.

8. The method according to claim 1, wherein the allulose syrup is colorless or light yellow allulose syrup comprising an allulose content of 10 wt % or more based on 100 wt % of the allulose syrup.

* * * * *